United States Patent
Kramer et al.

(10) Patent No.: US 8,702,115 B2
(45) Date of Patent: Apr. 22, 2014

(54) DRIVE MECHANISM AND BICYCLE DRIVE SYSTEM

(76) Inventors: Radu Kramer, Woodcliff Lake, NJ (US); William X. Desmond, Westwood, NJ (US)

(*) Notice: Subject to any disclaimer, the term of this patent is extended or adjusted under 35 U.S.C. 154(b) by 0 days.

(21) Appl. No.: 13/222,188

(22) Filed: Aug. 31, 2011

(65) Prior Publication Data

US 2012/0061940 A1    Mar. 15, 2012

Related U.S. Application Data

(60) Provisional application No. 61/403,340, filed on Sep. 14, 2010, provisional application No. 61/430,341, filed on Jan. 6, 2011.

(51) Int. Cl.
*B62M 1/04*    (2006.01)

(52) U.S. Cl.
USPC ........ 280/252; 280/250.1; 280/251; 280/253; 280/255; 280/256; 280/257

(58) Field of Classification Search
USPC ................................................. 280/252–257
See application file for complete search history.

(56) References Cited

U.S. PATENT DOCUMENTS

| | | |
|---|---|---|
| 457,290 A | 8/1891 | Phillips |
| 584,200 A | 6/1897 | Wheatley |
| 600,450 A | 3/1898 | Richmond et al. |
| 608,674 A | 8/1898 | Harshner |
| 651,676 A | 6/1900 | Storey |
| 689,303 A | 12/1901 | Hall |
| 2,391,809 A | 12/1945 | Wasem |
| 2,424,639 A | 7/1947 | Sobirai |
| 3,779,099 A | 12/1973 | Trammell, Jr. |
| 4,178,807 A | 12/1979 | Young |
| 4,456,276 A | 6/1984 | Bortolin |
| 4,467,668 A | 8/1984 | Tatch |
| 4,473,236 A | 9/1984 | Stroud |
| 4,564,206 A | 1/1986 | Lenhardt |
| 4,574,649 A | 3/1986 | Seol |
| 5,236,211 A | 8/1993 | Meguerditchian |
| 5,242,182 A | 9/1993 | Bezerra et al. |
| 5,335,927 A | 8/1994 | Islas |

(Continued)

FOREIGN PATENT DOCUMENTS

| FR | 2726532 A1 | 5/1996 |
|---|---|---|
| GB | 2219261 A | 12/1989 |

*Primary Examiner* — Joseph M Rocca
*Assistant Examiner* — Marlon Arce
(74) *Attorney, Agent, or Firm* — Arthur Jacob

(57) ABSTRACT

A drive mechanism effects a rotary power output in response to a reciprocating power input resulting from substantially linear forces applied to the drive mechanism, such as those forces applied by a rider on a bicycle. The drive mechanism includes input bevel gears meshed with corresponding output bevel gears coupled to a common power output shaft through clutches that effect a rotary power output at the power output shaft in response to the reciprocating power input from the substantially linear forces. Opposite crank arms are coupled with the input bevel gears such that each crank arm is advanced by an applied substantially linear force, and is retracted upon advancement of the opposite crank arm. In a bicycle, opposite pedals are coupled to corresponding crank arms and are moved through predetermined power strokes in response to substantially linear forces applied by a rider to effect corresponding rotational movements of the input bevel gears and concomitant rotary power output at the power output shaft.

9 Claims, 2 Drawing Sheets

(56) References Cited

U.S. PATENT DOCUMENTS

| | | |
|---|---|---|
| 5,351,575 A | 10/1994 | Overby |
| 5,419,572 A * | 5/1995 | Stiller et al. ............ 280/252 |
| 5,884,927 A * | 3/1999 | Mahaney et al. .......... 280/237 |
| 6,237,928 B1 | 5/2001 | Islas |
| 6,336,646 B1 | 1/2002 | Bernardini |
| 6,588,784 B1 * | 7/2003 | Chen ...................... 280/221 |
| 6,723,029 B2 | 4/2004 | Salgado |
| 6,779,807 B2 * | 8/2004 | Huret ...................... 280/257 |
| 7,487,987 B2 * | 2/2009 | Yan ........................ 280/221 |
| 7,607,370 B2 | 10/2009 | Day et al. |
| 7,644,944 B2 * | 1/2010 | Nicolai .................... 280/257 |
| 7,717,448 B2 | 5/2010 | Clemons et al. |
| 7,823,898 B2 * | 11/2010 | Hartmann ................ 280/253 |

* cited by examiner

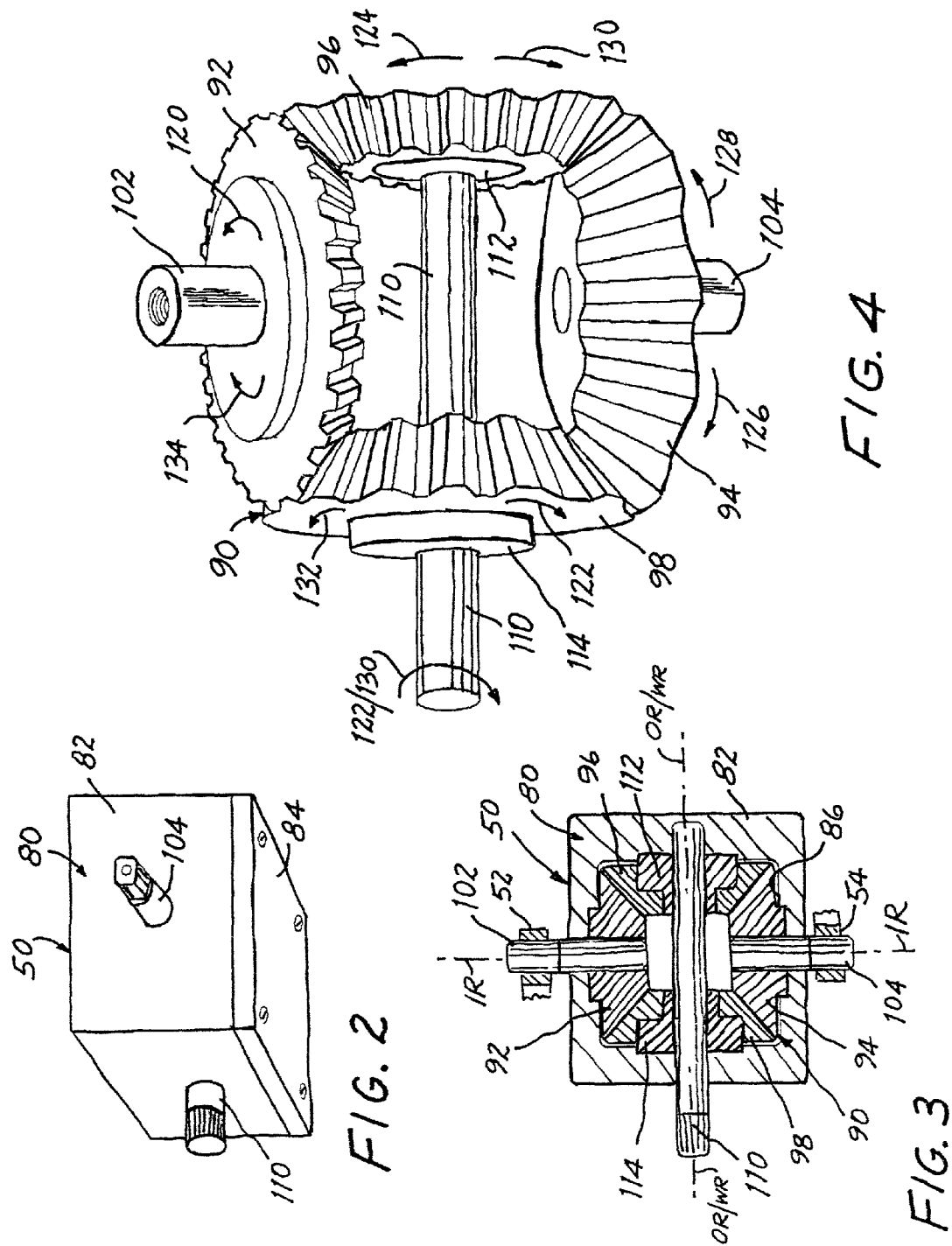

DRIVE MECHANISM AND BICYCLE DRIVE SYSTEM

This application claims the benefit of U.S. Provisional Patent Application Ser. No. 61/403; 340, filed Sep. 14, 2010, and U.S. Provisional Patent Application Ser. No. 61/403,341, filed Sep. 14, 2010, the entire disclosures of which are incorporated herein by reference thereto.

The present invention relates generally to drive mechanisms and pertains, more specifically, to a gear drive mechanism for effecting a rotary power output in response to a reciprocating input, such as substantially linear arm or leg movements of an operator and, more particularly, to a bicycle drive system in which reciprocating substantially linear forces applied by a rider effect a rotary power output for driving the bicycle.

In a preferred embodiment, the drive mechanism of the present invention enables a human operator to apply input power using reciprocating substantially linear arm motion or leg motion to create an effective rotary power output. A myriad of devices, equipment and apparatus which require a rotary power input are improved by the incorporation of the present drive mechanism to allow a human operator to use arms or legs moved along substantially linear paths to apply, with greater ease, comfort and effectiveness, forces to be converted by the drive mechanism into a rotational output well suited to the provision of a requisite rotary power output.

Examples of such devices, equipment and apparatus are as follows: Wheeled vehicles such as bicycles, tricycles and carts in which substantially linear leg movements of an operator are used to create a rotational output for driving at least one drive wheel of the vehicle; boat propulsion systems in which substantially linear arm or leg movements of an operator create a rotational power output to at least one propeller of the propulsion system; exercise equipment and machines in which substantially linear arm or leg movements drive at least one rotating resistance member; lifts, hoists, winches and windlasses in which a power input from substantially linear arm movements provide rotational power for rotating a drum or pulley system. In addition, the present gear drive mechanism is adapted readily to a very wide variety of industrial uses where substantially linear movements of a worker's arms or legs can be converted effectively to provide a rotary power output.

In the following detailed description, a gear drive mechanism constructed in accordance with the present invention is adapted to serve as a transmission in an improved bicycle drive system. Bicycles have been developed over many years as utilitarian means of transportation, as well as for sports, recreation and exercise purposes. Those bicycles which are driven by pedals have incorporated many different drive systems for coupling pedals powered by a rider with at least one driven wheel of the bicycle.

A gear drive mechanism constructed in accordance with the present invention provides a transmission in a unique drive system in which reciprocating pedals are coupled to a driven wheel through a unique drive system that incorporates all of the recognized advantages of reciprocating pedal arrangements while attaining highly desirable additional objects and advantages not heretofore made available in a bicycle drive system. Among these objects and advantages are: Increased effectiveness and greater simplicity of construction in a drive mechanism that converts reciprocating substantially linear input forces to a rotary power output; provides a compact construction for increased versatility and widespread use in a myriad of applications; reduces any possible loss of effectiveness while converting reciprocating substantially linear input forces into a continuous rotary power output; provides an optimum relative location between a bicycle rider's seating and the drive pedals of a bicycle for greater comfort, increased ease of operation and higher efficiency through a more uniform application by the rider of driving force; enables ready adjustment for different performance objectives; exhibits smooth and quiet operation; reduces wear of component parts of the drive system; provides more resistance to dirt and other debris encountered in the field; reduces requirements for periodic maintenance and repair; eliminates sources of rattling and other unwanted noises when traversing rough roads, bumps and other discontinuities along the path of travel of a bicycle; enables increased longevity for exemplary performance over an extended service life.

The above objects and advantages, as well as further objects and advantages, are attained by the present invention, which may be described briefly as a drive mechanism for effecting a rotary power output in response to a reciprocating power input resulting from substantially linear forces applied to the drive mechanism, the drive mechanism comprising: a first input drive arrangement mounted for rotation in each one of opposite first and second directions of rotation about a first input axis of rotation, the first input drive arrangement being rotatable in the first direction of rotation in response to a substantially linear force applied to the drive mechanism; a first output drive arrangement coupled with the first input drive arrangement for rotation about a first output axis of rotation in response to rotation of the first input drive arrangement; a power output shaft mounted for rotation about a power output axis of rotation; a first clutch arrangement coupling the first output drive arrangement with the power output shaft such that upon rotation of the first input drive arrangement in the first direction of rotation about the first input axis of rotation, the power output shaft is rotated in a power output direction, and such that rotation of the first input drive arrangement is permitted in the second direction of rotation independent of rotation of the power output shaft; a second input drive arrangement mounted for rotation in each one of opposite first and second directions of rotation about a second input axis of rotation, the second input drive arrangement being rotatable in the first direction of rotation in response to a substantially linear force applied to the drive mechanism; a second output drive arrangement coupled with the second input drive arrangement for rotation about a second output axis of rotation in response to rotation of the second input drive arrangement; and a second clutch arrangement coupling the second output drive arrangement with the power output shaft such that upon rotation of the second input drive arrangement in the first direction of rotation about the second input axis of rotation, the power output shaft is rotated in the power output direction, and such that rotation of the second input drive arrangement is permitted in the second direction of rotation about the second input axis of rotation independent of rotation of the power output shaft; whereby substantially linear forces applied to the drive mechanism effect corresponding rotational movements in the first and second input drive arrangements in corresponding first directions of rotation and a concomitant rotary power output in the power output direction at the power output shaft.

In addition, the present invention includes a bicycle having a bicycle drive for effecting a rotary power output in response to a reciprocating power input resulting from substantially linear forces applied by a rider, the bicycle comprising: a frame; a seat mounted on the frame; and a drive mechanism mounted on the frame, the drive mechanism comprising: a first input drive arrangement mounted for rotation in each one of opposite first and second directions of rotation about a first input axis of rotation, the first input drive arrangement being rotatable in the first direction of rotation in response to a substantially linear force applied by a rider; a first output drive arrangement coupled with the first input drive arrangement for rotation about a first output axis of rotation in response to rotation of the first input drive arrangement; a power output shaft mounted for rotation about a power output axis of rotation; a first clutch arrangement coupling the first output drive arrangement with the power output shaft such that upon rotation of the first input drive arrangement in the first direction of rotation about the first input axis of rotation, the power output shaft is rotated in a power output direction, and such that rotation of the first input drive arrangement is permitted in the second direction of rotation independent of rotation of the power output shaft; a second input drive arrangement mounted for rotation in each one of opposite first and second directions of rotation about a second input axis of rotation, the second input drive arrangement being rotatable in the first direction of rotation in response to a substantially linear force applied by a rider; a second output drive arrangement coupled with the second input drive arrangement for rotation about a second output axis of rotation in response to rotation of the second input drive arrangement; and a second clutch arrangement coupling the second output drive arrangement with the power output shaft such that upon rotation of the second input drive arrangement in the first direction of rotation about the second input axis of rotation, the power output shaft is rotated in the power output direction, and such that rotation of the second input drive arrangement is permitted in the second direction of rotation about the second input axis of rotation independent of rotation of the power output shaft; whereby substantially linear forces applied by the rider effect corresponding rotational movements in the first and second input drive arrangements in corresponding first directions of rotation and a concomitant rotary power output in the power output direction at the power output shaft.

The invention will be understood more fully, while still further objects and advantages will become apparent, in the following detailed description of preferred embodiments of the invention illustrated in the accompanying drawing, in which:

FIG. 2 is a somewhat diagrammatic isometric view of the transmission;

FIG. 3 is a somewhat schematic diagram of the transmission; and

FIG. 4 is a largely diagrammatic pictorial view of a gear train in the gearing arrangement of the gear drive mechanism of the transmission.

Figure 1:
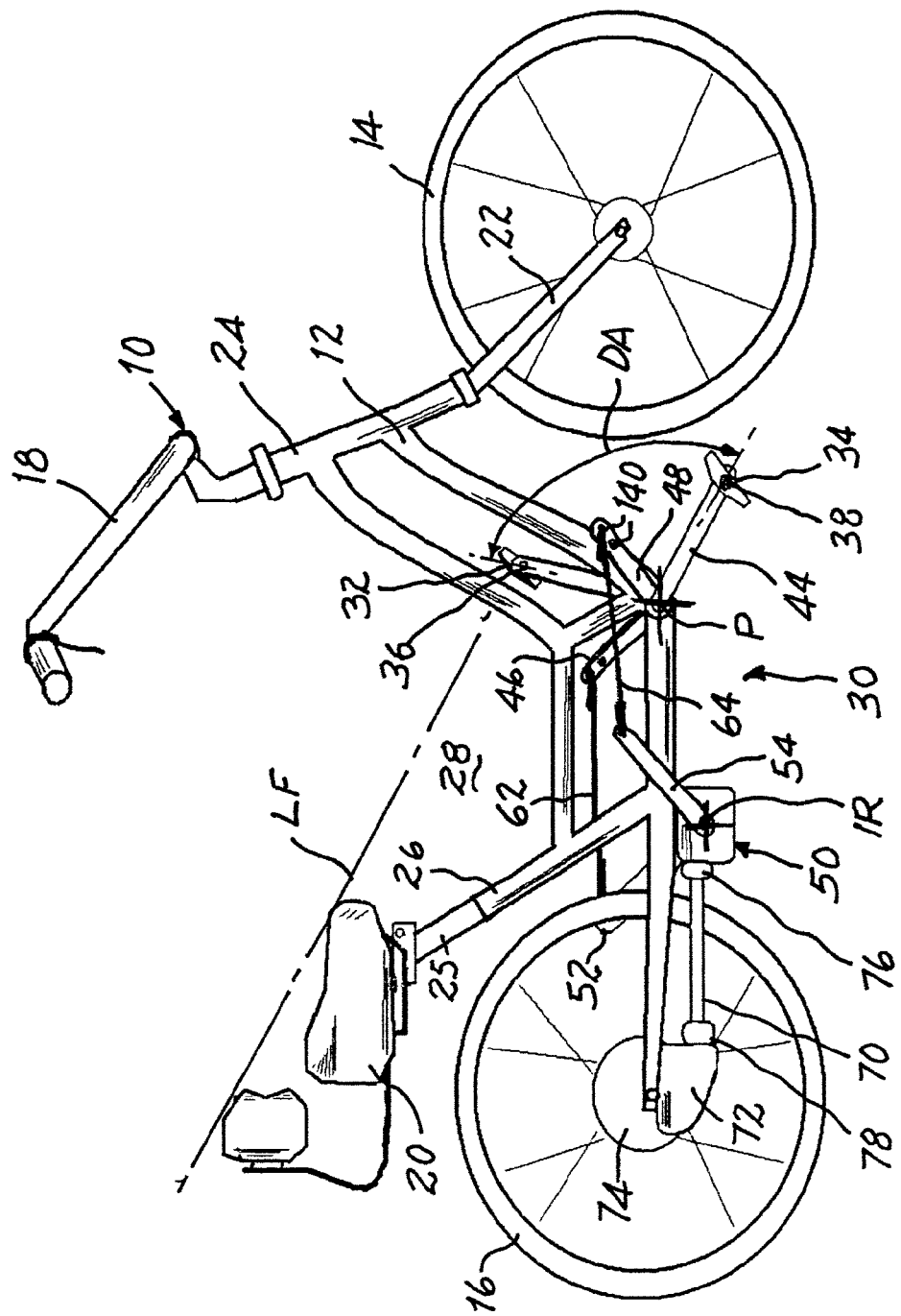
FIG. 1 is a side elevational view of a bicycle incorporating a drive system utilizing a transmission incorporating a gear drive mechanism constructed in accordance with the present invention.

Referring now to the drawing, and especially to FIG. 1 thereof, a bicycle 10 has a frame 12 which carries a front wheel 14, a rear wheel 16, a handlebar 18 and a seat 20. The front wheel 14 is coupled to the frame 12 by a fork 22 which extends through a head tube 24 of the frame 12 for swiveling relative to the frame 12 in response to steering movements of the handlebar 18, as is conventional in the construction of bicycles. The seat 20 is mounted upon a post 25 that telescopically engages a rearward section 26 of frame 12, and a longitudinal spacing 28 between the head tube 22 and the rearward section 26 provides for easy step-through upon mounting on or dismounting from the bicycle 10.

A drive system is shown at 30 and is seen to include opposite pedals shown in the form of a left pedal 32 and a right pedal 34, each pedal 32 and 34 being mounted upon the frame 12 for pivotal movement about a pivotal axis P, between a first position, as illustrated in FIG. 1 by upper position 36 of left pedal 32, and a second position, as illustrated by lower position 38 of right pedal 34. Left pedal 32 is carried by a corresponding left forward crank arm 42, and right pedal 34 is carried by a corresponding right forward crank arm 44, each of which crank arms 42 and 44 pivots about the pivotal axis P in response to the application of a driving force to move a corresponding pedal 32, 34 from an upper position 36 to a lower position 38. A left lever 46 is coupled for pivotal movement with left forward crank arm 42, and a right lever 48 is coupled for pivotal movement with the right forward crank arm 44, for purposes to be described below.

A transmission incorporating a gear drive mechanism constructed in accordance with the present invention is shown at 50 and is seen affixed to the frame 12, intermediate the front wheel 14 and the rear wheel 16. Transmission 50 carries opposite crank arms shown in the form of a left rear crank arm 52 and a right rear crank arm 54, both crank arms 52 and 54 being mounted upon transmission 50 for rotation about a common axis of rotation IR. A left link 62 couples left rear crank arm 52 for movement with left lever 46, and a right link 64 couples right rear crank arm 54 for movement with right lever 48. A drive shaft 70 extends longitudinally between the transmission 50 and a bevel gear set 72 which, in turn, is engaged with an internal gearing drive 74 coupled to the rear wheel 16. A forward coupling 76 connects the drive shaft 70 to transmission 50, while a rearward coupling 78 connects the drive shaft 70 to the bevel gear set 72.

Turning now to FIGS. 2 through 4, as well as with reference to FIG. 1, transmission 50 includes a casing 80 in the form of a gear box 82 having a removable cover 84 which, when in place as seen in FIG. 2, seals the interior 86 of the gear box 82 against the entry of foreign matter encountered outside the gear box 82 while maintaining a gear train 90 within the interior 86, in working arrangement and protected against outside elements. Gear train 90 is comprised of four bevel gears, including a left-pedal gear 92 of a first input drive arrangement, a right-pedal gear 94 of a second input drive arrangement, a forward drive gear 96 of a first output drive arrangement, and a rearward drive gear 98 of a second output drive arrangement, all of which gears are meshed in an orthogonal, box-like arrangement, as seen in FIGS. 3 and 4. The left-pedal gear 92 is connected to the left rear crank arm 52 through a left stub shaft 102, and the right-pedal gear 94 is connected to the right rear crank arm 54 through a right stub shaft 104, both the stub shafts 102 and 104 being journaled for rotation about the common input axis of rotation IR, while both drive gears 96 and 98 are journaled for rotation about a common output axis of rotation OR. The forward drive gear 96 and the rearward drive gear 98 are coupled with a power output shaft 110 through first and second clutch arrangements, the forward drive gear 96 being coupled to shaft 110 by means of a one-way clutch 112 of a first clutch arrangement, and the rearward drive gear 98 being coupled to shaft 110 by means of a one-way clutch 114 of a second clutch arrangement. Thus, in the orthogonal arrangement, the input axis of rotation IR is substantially perpendicular to output axis of rotation OR, and the output axis of rotation OR is coextensive with a power output axis of rotation WR.

Upon movement of the left pedal 32 from the upper position 36 to the lower position 38, corresponding movement of the left lever 46 will advance the left rear crank arm 52 to rotate the left-pedal gear 92 in the direction of arrow 120 which, in turn, will rotate the rearward drive gear 98 in the direction of arrow 122. Clutch 114 is arranged to engage rearward drive gear 98 with shaft 110 upon rotation of rearward drive gear 98 in the direction of arrow 122 so that power is transmitted from the left-pedal gear 92 to the rearward drive gear 98, and then to power output shaft 110 which also is rotated in the direction of arrow 122, as the left pedal 32 moves from the upper position 36 to the lower position 38. Power output shaft 110 is coupled with drive shaft 70, at forward coupling 76, so that power applied to the left pedal 32 is transmitted to drive shaft 70 which, in turn, drives bevel gear set 72 and internal gearing drive 74 to apply motive power to rear wheel 16.

At the same time, the forward drive gear 96 will be rotated by the left-pedal gear 92 in the direction of arrow 124, clutch 112 being arranged to disengage forward drive gear 96 from shaft 110 and thereby allow free rotation of forward drive gear 96 relative to and independent of shaft 110, in the direction of arrow 124. Rotation of rearward drive gear 98 in the direction of arrow 122, and rotation of forward drive gear 96 in the direction of arrow 124, will effect rotation of right-pedal gear 34 in the direction of arrow 126, consequently rotating stub shaft 104 to retract right rear crank arm 54 so as to draw right lever 48 rearwardly and thereby raise right pedal 34 upwardly from the lower position 38 to the upper position 36.

With the right pedal 34 now at the upper position 36, and the left pedal 32 at the lower position 38, the rider (not shown) applies power to the right pedal 34, moving the right pedal 34 to the lower position 38 and rotating the right-pedal gear 94 in the direction of arrow 128. In turn, the forward drive gear 96 will be rotated in the direction of arrow 130. Clutch 112 is arranged to engage forward drive gear 96 with shaft 110 upon rotation of forward drive gear 96 in the direction of arrow 130, so that power is transmitted from the right-pedal gear 94 to the forward drive gear 96, and then to power output shaft 110 which also is rotated in the direction of arrow 130, as the right pedal 34 moves from the upper position 36 to the lower position 38. Power output shaft 110 is coupled with drive shaft 70 so that power applied to the right pedal 34 is transmitted to drive shaft 70 which, in turn, drives bevel gear set 72 and internal gearing drive 74 to apply motive power to rear wheel 16.

At the same time, the rearward drive gear 98 will be rotated by the right-pedal gear 94 in the direction of arrow 132, clutch 114 being arranged to disengage rearward drive gear 98 from shaft 110 and thereby allow free rotation of rearward drive gear 98 relative to and independent of shaft 110, in the direction of arrow 132. Rotation of forward drive gear 96 in the direction of arrow 130, and rotation of rearward drive gear 98 in the direction of arrow 132, will effect rotation of left-pedal gear 92 in the direction of arrow 134, consequently rotating stub shaft 102 to retract left rear crank arm 52 so as to draw left lever 46 rearwardly and thereby raise left pedal 32 upwardly from the lower position 38 to the upper position 36. The entire power cycle is repeated as the bicycle is driven along its path of travel.

Returning now to FIG. 1, drive system 30 is arranged so that the travel of each pedal 32 and 34 between the upper position 36 and the lower position 38 is over a power stroke having a displacement angle DA of about 90° to about 130°, thereby maintaining an optimum application of power to the pedals 32 and 34 throughout every power stroke. In order to facilitate the transfer of power from a rider to the pedals 32 and 34 with maximum efficiency, while promoting rider comfort, seat 20 is placed so as to be juxtaposed with a selected line of force LF extending through each upper position 36 of pedals 32 and 34. The inclination of the line of force LF relative to frame 12 is adjustable, by virtue of the telescopic engagement between post 25 and section 26 of the frame 12, to optimize performance, depending upon the use to which bicycle 10 is to be put. Thus, adjustments of the line of force LF can accommodate such demands as the need for speed over a selected course, hill climbing where desired, cruising over long distances, or meeting any other requirements to accommodate a particular use. Drive system 30 itself is adjusted readily to meet such requirements. To that end, links 62 and 64 are placed at any selected one of alternate locations 140 made available along corresponding levers 46 and 48 to transmit force applied to pedals 32 and 34 to rear crank arms 52 and 54. It is noted that a rider is able to shorten or lengthen his or her power stroke at will during the course of a ride in order to compensate for varying conditions encountered along the path of travel of the bicycle. For example, by maintaining the power stroke within a short range of motion wherein the crank arms 52 and 54 are positioned relative to links 62 and 64 for the application of maximum torque to the gear train 90, the rider can apply a greater power input in a shorter time, as may be required for climbing a hill, for example, without the necessity for resorting to a gear change, as would be the procedure followed with a conventional bicycle.

Drive system 30 is compact, easily adjusted to the particular requirements of a rider, and is integrated readily into bicycle 10. Internal gearing drive 74 may be selected from any one of variety of available conventional internal gearing drives, enabling increased versatility in the construction of bicycle 10. The sealed transmission 50 resists infiltration of dirt, debris or other foreign matter which could cause deleterious effects such as diminished performance and premature wear, while reducing the requirement for frequent periodic maintenance and repair. The combination of the sealed transmission 50 and the drive shaft 70 provides a relatively rigid construction, more resistant to dirt and other foreign matter, as well as roadway hazards encountered while on the road. Moreover, operation is quiet and substantially rattle-free, as compared to conventional sprocket-and-chain drives.

It will be apparent that transmission 50 has applications in many settings that require a drive arrangement in which a reciprocating power input is coupled to a rotating power output shaft. Depending upon the requirements of a particular setting, transmission 50 can be provided with suitable operating members, such as handgrips or the like, rather than the pedals described above in connection with a bicycle. Thus, as noted in the examples set forth above, transmission 50 can find use in propulsion systems for other vehicles, including multiple wheeled vehicles such as tricycles and carts and propeller drives for boats. In addition, transmission 50 can be adapted to exercise machines and equipment, lifts, hoists, winches, windlasses and like devices, as well as to a wide variety of industrial uses where substantially linear reciprocating movements of an operator's arms or legs are converted to rotational movement of a power output shaft.

It will be seen that the present invention attains all of the objects and advantages outlined above, namely: Increased effectiveness and greater simplicity of construction in a drive mechanism that converts reciprocating substantially linear input forces to a rotary power output; provides a compact construction for increased versatility and widespread use in a myriad of applications; reduces any possible loss of effectiveness while converting reciprocating substantially linear input forces into a continuous rotary power output; provides an optimum relative location between a bicycle rider's seating and the drive pedals of a bicycle for greater comfort, increased ease of operation and higher efficiency through a more uniform application by the rider of driving force; enables ready adjustment for different performance objectives; exhibits smooth and quiet operation; reduces wear of component parts of the drive system; provides more resistance to dirt and other debris encountered in the field; reduces requirements for periodic maintenance and repair; eliminates sources of rattling and other unwanted noises when traversing rough roads, bumps and other discontinuities along the path of travel of a bicycle; enables increased longevity for exemplary performance over an extended service life.

It is to be understood that the above detailed description of preferred embodiments of the invention is provided by way of example only. Various details of design and construction may be modified without departing from the true spirit and scope of the invention, as set forth in the appended claims.

The embodiments of the invention in which an exclusive property or privilege is claimed are defined as follows:

1. A bicycle having a bicycle drive for effecting a rotary power output in response to a reciprocating power input resulting from substantially linear forces applied by a rider, the bicycle comprising:
   a frame;
   two wheels mounted for rotation on the frame, the two wheels comprising a forward wheel and a rearward wheel, the rearward wheel being mounted on a rearward section of the frame, and the forward wheel being spaced from the rearward wheel in a longitudinal direction;
   a seat mounted on the frame by a mounting arrangement; and
   a drive mechanism mounted on the frame, the drive mechanism comprising:
   a first input drive arrangement mounted for rotation in each one of opposite first and second directions of rotation about a first input axis of rotation, the first input drive arrangement being rotatable in the first direction of rotation in response to a substantially linear force applied by a rider;
   a first output drive arrangement coupled with the first input drive arrangement for rotation about a first output axis of rotation in response to rotation of the first input drive arrangement;
   a power output shaft mounted for rotation about a power output axis of rotation;
   a first clutch arrangement coupling the first output drive arrangement with the power output shaft such that upon rotation of the first input drive arrangement in the first direction of rotation about the first input axis of rotation, the power output shaft is rotated in a power output direction, and such that rotation of the first input drive arrangement is permitted in the second direction of rotation independent of rotation of the power output shaft;
   a second input drive arrangement mounted for rotation in each one of opposite first and second directions of rotation about a second input axis of rotation, the second input drive arrangement being rotatable in the first direction of rotation in response to a substantially linear force applied by a rider;
   a second output drive arrangement coupled with the second input drive arrangement for rotation about a second output axis of rotation in response to rotation of the second input drive arrangement;
   a second clutch arrangement coupling the second output drive arrangement with the power output shaft such that upon rotation of the second input drive arrangement in the first direction of rotation about the second input axis of rotation, the power output shaft is rotated in the power output direction, and such that rotation of the second input drive arrangement is permitted in the second direction of rotation about the second input axis of rotation independent of rotation of the power output shaft;
   a pedal arrangement mounted upon the frame, the pedal arrangement comprising:
   a first pedal mounted upon the frame for pivotal movement in an advance direction about a first pivotal axis spaced in the longitudinal direction from the first input axis of rotation in response to a substantially linear force applied by the rider to the first pedal, and in a retraction direction opposite to the advance direction; and
   a second pedal mounted upon the frame for pivotal movement in an advance direction about a second pivotal axis spaced in the longitudinal direction from the second input axis of rotation in response to a substantially linear force applied by the rider to the second pedal, and in a retraction direction opposite to the advance direction;
   a drive shaft extending along the power output axis of rotation between a first end and a second end, the drive shaft being coupled at the first end directly with the power output shaft for rotation about the power axis of rotation upon rotation of the power output shaft;
   a gear set coupled to one of the two wheels; and
   the second end of the drive shaft being coupled directly with the gear set;
   the first pedal being coupled with the first input drive arrangement, and the second pedal being coupled with the second input drive arrangement such that substantially linear forces applied by the rider to the first and second pedals will advance each first and second pedal along a corresponding advance direction and effect corresponding rotational movements in the first and second input drive arrangements in corresponding first directions of rotation and a concomitant rotary power output in the power output direction at the power output shaft, for rotating the drive shaft and the one of the two wheels to drive the bicycle in response to the substantially linear forces applied by the rider.

2. A bicycle having a bicycle drive for effecting a rotary power output in response to a reciprocating power input resulting from substantially linear forces applied by a rider, the bicycle comprising:
   a frame;
   two wheels mounted for rotation on the frame;
   a seat mounted on the frame by a mounting arrangement; and
   a drive mechanism mounted on the frame, the drive mechanism comprising:
   a first input drive arrangement mounted for rotation in each one of opposite first and second directions of rotation about a first input axis of rotation, the first input drive arrangement being rotatable in the first direction of rotation in response to a substantially linear force applied by a rider;
   a first output drive arrangement coupled with the first input drive arrangement for rotation about a first output axis of rotation in response to rotation of the first input drive arrangement;
   a power output shaft mounted for rotation about a power output axis of rotation;
   a first clutch arrangement coupling the first output drive arrangement with the power output shaft such that upon rotation of the first input drive arrangement in the first direction of rotation about the first input axis of rotation, the power output shaft is rotated in a power output direction, and such that rotation of the first input drive arrangement is permitted in the second direction of rotation independent of rotation of the power output shaft;

a second input drive arrangement mounted for rotation in each one of opposite first and second directions of rotation about a second input axis of rotation, the second input drive arrangement being rotatable in the first direction of rotation in response to a substantially linear force applied by a rider;

a second output drive arrangement coupled with the second input drive arrangement for rotation about a second output axis of rotation in response to rotation of the second input drive arrangement;

a second clutch arrangement coupling the second output drive arrangement with the power output shaft such that upon rotation of the second input drive arrangement in the first direction of rotation about the second input axis of rotation, the power output shaft is rotated in the power output direction, and such that rotation of the second input drive arrangement is permitted in the second direction of rotation about the second input axis of rotation independent of rotation of the power output shaft;

a drive shaft extending along the power output axis of rotation between a first end and a second end, the drive shaft being coupled at the first end directly with the power output shaft for rotation about the power axis of rotation upon rotation of the power output shaft;

a gear set coupled to one of the two wheels; and the second end of the drive shaft being coupled directly with the gear set;

whereby substantially linear forces applied by the rider effect corresponding rotational movements in the first and second input drive arrangements in corresponding first directions of rotation and a concomitant rotary power output in the power output direction at the power output shaft, for rotating the drive shaft and the one of the two wheels to drive the bicycle in response to the substantially linear forces applied by the rider; and wherein the two wheels comprise a forward wheel and a rearward wheel, the rearward wheel being mounted on a rearward section of the frame, and the forward wheel being spaced from the rearward wheel in a longitudinal direction;

the bicycle includes a pedal arrangement mounted upon the frame, the pedal arrangement comprising:

a first pedal mounted upon the frame for pivotal movement in an advance direction about a first pivotal axis in response to a substantially linear force applied by the rider to the first pedal, and in a retraction direction opposite to the advance direction; and a second pedal mounted upon the frame for pivotal movement in an advance direction about a second pivotal axis in response to a substantially linear force applied by the rider to the second pedal, and in a retraction direction opposite to the advance direction;

the first pedal being coupled with the first input drive arrangement, and the second pedal being coupled with the second input drive arrangement such that upon advancement of each first and second pedal along a corresponding advance direction, the power output shaft is rotated about the power output axis of rotation;

the pivotal movement of each of the first pedal and the second pedal in a corresponding advance direction follows a power stroke having a predetermined displacement angle between a first position and a second position of each pedal, each first position being located longitudinally between the forward wheel and a corresponding one of the first and second pivotal axes and elevated above a corresponding second position;

the seat is located at an elevated position on the frame, juxtaposed with a line of force inclined with respect to the longitudinal direction and extending through each first position; and the mounting arrangement of the seat is configured for selecting the elevated position of the seat to thereby select a corresponding inclination of the line of force relative to the frame.

3. The bicycle of claim 2 wherein the predetermined displacement angle is in the range of about 90° to about 130°.

4. The bicycle of claim 2 wherein:

the second output drive arrangement is coupled with the first input drive arrangement such that upon rotation of the second input drive arrangement in the first direction of rotation about the second input axis of rotation, the first input drive arrangement is rotated in the second direction of rotation about the first input axis or rotation; and the first output drive arrangement is coupled with the second input drive arrangement such that upon rotation of the first input drive arrangement in the first direction of rotation about the first input axis of rotation, the second input drive arrangement is rotated in the second direction of rotation about the second input axis of rotation.

5. The bicycle of claim 2 wherein the first and second input axes of rotation are coextensive.

6. The bicycle of claim 2 wherein:

the first input drive arrangement includes a first input drive gear;

the first output drive arrangement includes a first output drive gear meshed with the first input drive gear;

the second input drive arrangement includes a second input drive gear; and the second output drive arrangement includes a second output drive gear meshed with the second input drive gear.

7. The bicycle of claim 6 wherein:

the first output drive gear is mounted for rotation about the first output axis of rotation, and the first output axis of rotation is coextensive with the power axis of rotation;

the first clutch arrangement includes a first clutch coupling the first output drive gear with the power output shaft such that rotation of the first input drive gear in the first direction of rotation about the first input axis of rotation effects rotation of the power output shaft in the power output direction, and such that rotation of the first input drive gear is permitted in the second direction of rotation independent of rotation of the power output shaft;

the second output drive gear is mounted for rotation about the second output axis of rotation, and the second output axis of rotation is coextensive with the power axis of rotation; and the second clutch arrangement includes a second clutch coupling the second output drive gear with the power output shaft such that rotation of the second input drive gear in the first direction of rotation about the second input axis of rotation effects rotation of the power output shaft in the power output direction, and such that rotation of the second input drive gear is permitted in the second direction of rotation independent of rotation of the power output shaft.

8. The bicycle of claim 7 wherein:

the first input axis of rotation is coextensive with the second input axis of rotation;

the first and second input axes of rotation are substantially perpendicular to the power output axis of rotation;

the first output axis of rotation is coextensive with the second output axis of rotation, and the first and second output axes of rotation are coextensive with the power output axis of rotation;

each of the first and second input drive gears comprises a bevel gear; and each of the first and second output drive gears comprises a bevel gear meshed with each of the first and second input drive gears;

whereby upon rotation of the second input drive gear in the first direction of rotation about the second input axis of rotation, the first input drive gear is rotated in the second direction of rotation about the first input axis or rotation; and upon rotation of the first input drive gear in the first direction of rotation about the first input axis of rotation, the second input drive gear is rotated in the second direction of rotation about the second input axis of rotation.

9. The bicycle of claim 8 wherein:

the first input drive arrangement includes a first crank arm coupled with the first input drive gear for movement between a first position and a second position in response to a substantially linear force applied by a rider;

the second input drive arrangement includes a second crank arm coupled with the second input drive gear for movement between a first position and a second position in response to a substantially linear force applied by a rider; and the first and second crank arms are arranged relative to one another such that upon movement of the first crank arm from the first position thereof to the second position thereof, the second crank arm is moved from the second position thereof to the first position thereof, and upon movement of the second crank arm from the first position thereof to the second position thereof, the first crank arm is moved from the second position thereof to the first position thereof.

* * * * *